(No Model.) 4 Sheets—Sheet 4.

O. HAMMOND, Jr.
ICE MAKING APPARATUS.

No. 547,251. Patented Oct. 1, 1895.

Witnesses:
C. R. Weaver.
A. O. Babendreier

Inventor.
Ormond Hammond Jr
by
Price & Stuart
Attorneys

UNITED STATES PATENT OFFICE.

ORMOND HAMMOND, JR., OF BALTIMORE, MARYLAND, ASSIGNOR OF ONE-HALF TO REUTER & MALLORY AND ELI SCOTT MERRYMAN, OF SAME PLACE.

ICE-MAKING APPARATUS.

SPECIFICATION forming part of Letters Patent No. 547,251, dated October 1, 1895.

Application filed March 1, 1894. Serial No. 501,906. (No model.)

*To all whom it may concern:*

Be it known that I, ORMOND HAMMOND, Jr., of the city of Baltimore and State of Maryland, have invented an Improvement in Methods of Ice-Making and the Mechanisms or Plant Used for this Purpose, of which the following is a full specification.

Figure 1:
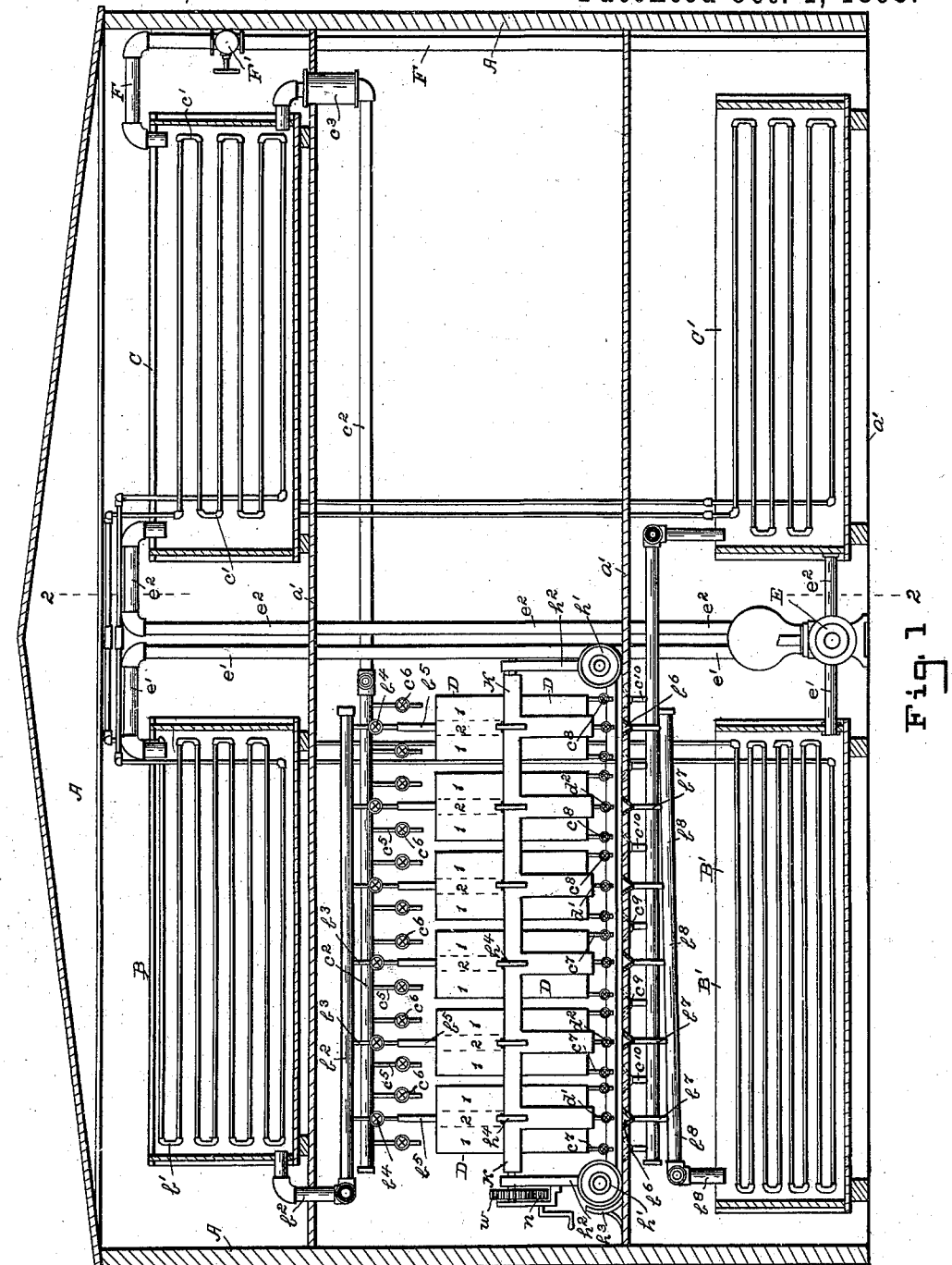
Figure 2:
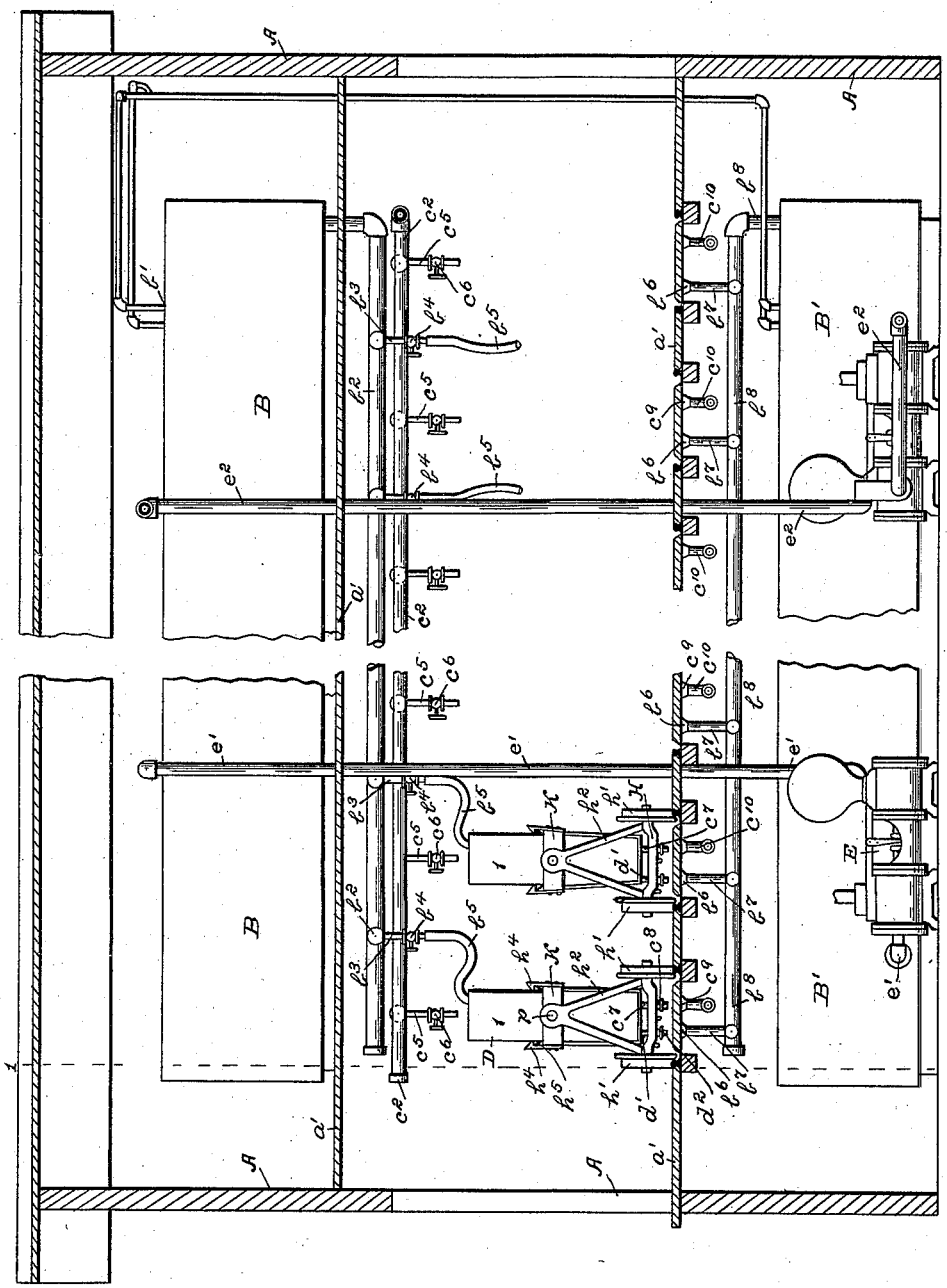
Figure 3:
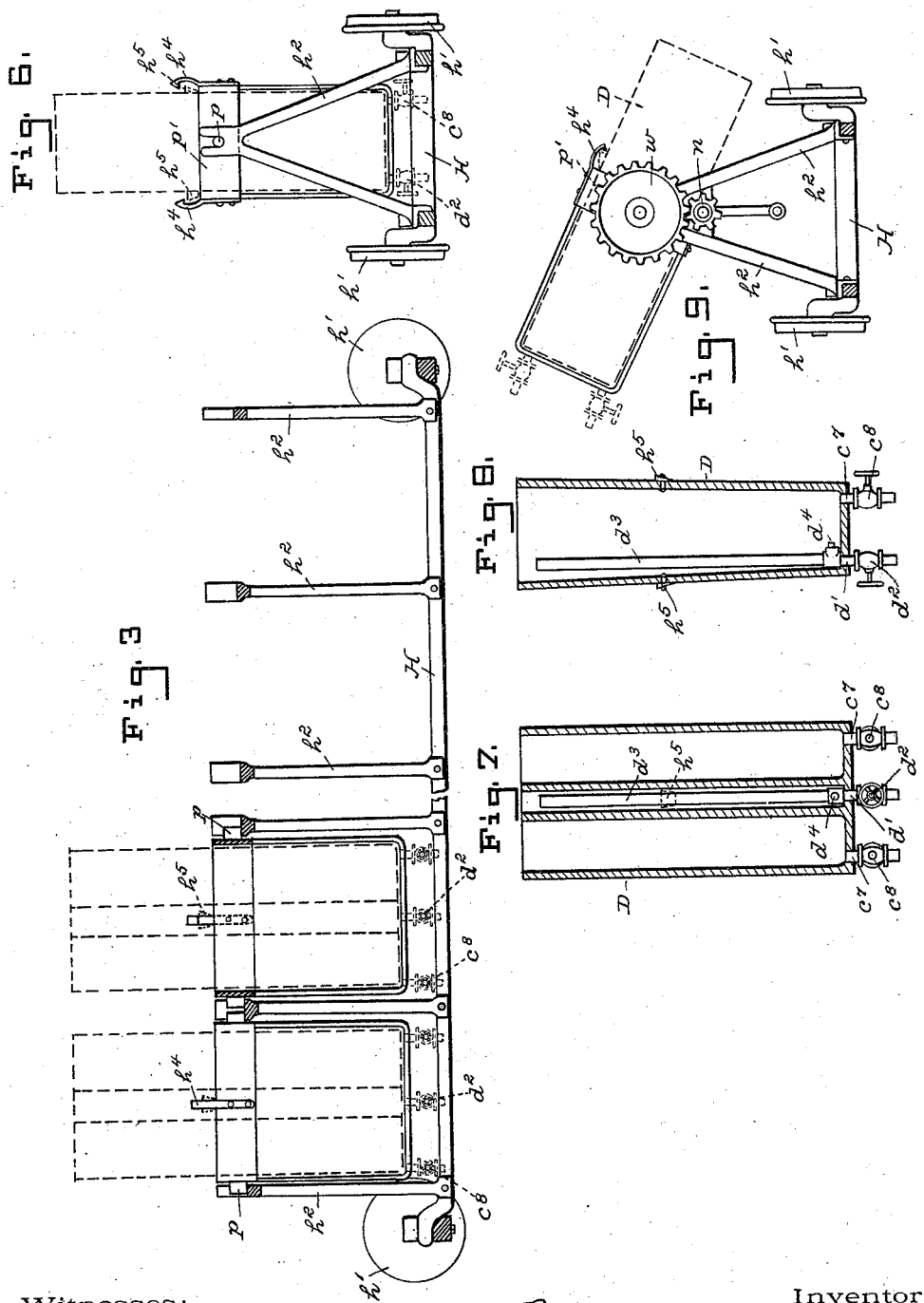
Figure 4:
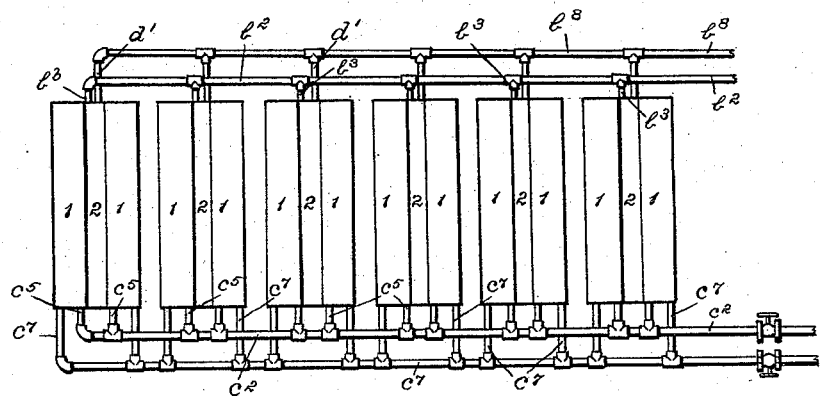
Figure 5:
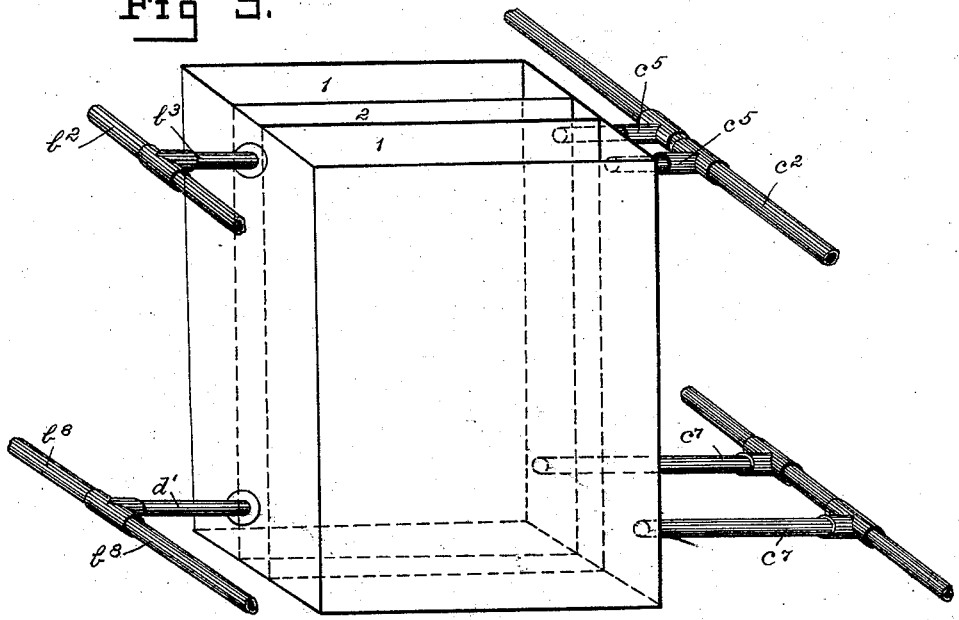

Figure 1 of the drawings is a sectional view of the apparatus, taken on the line 1 1 of Fig. 2, showing the fresh-water and brine chambers and the cans mounted upon a truck with the connections of the cans to the brine and fresh-water supply. Fig. 2 is a sectional view taken on line 2 2 of Fig. 1, in which tanks, trucks, cans, and their connections are shown. Fig. 3 is a side view of a truck provided with bearings for each can separately, so that any one may be dumped without disturbing the others. Fig. 4 is a view of a series of cans with pipe connections; Fig. 5, an isometrical view of a double can, showing brine-chamber centrally located; Fig. 6, an end view of truck with can in its bearing; Figs. 7 and 8, sectional views of a can and drain-pipes; Fig. 9, an end view of truck in Fig. 1, showing can tilted to allow block of ice to slip out.

Viewing Fig. 1, A represents the sides and top walls of the cooling-chambers; $a$, the floors upon which the apparatus is located. On the top floor is shown B, the brine-receptacle, and C the fresh-water receptacle. The coils of pipes $b'$ $c'$ are connected with a supply of anhydrous ammonia or other heat-absorbing agent, and in these two tanks both the brine and the fresh water are primarily cooled. In the receptacle B, which contains the brine, there is placed near the bottom a pipe $b^2$, provided with branch pipes $b^3$, having regulating-cocks $b^4$, by which the outflow of the brine is controlled, and which for convenience are connected with a hose, as $b^5$, if required. Upon the floor below are shown a series of outstanding cans D, pivotally mounted upon a truck or car. As shown in the drawings, these cans are represented as double cans—that is to say, 1 1 represents the fresh-water chamber and 2 2 a partitioned space for the brine. Communicating with this partitioned space there is shown a short tube $d'$, provided with a regulating-cock $d^2$, whose outlets are so arranged that they project over or into the funnel end $b^6$ of the pipes $b^7$, the ends of which communicate with the pipe $b^8$, which leads into a tank B' on the floor below, which is also provided with cooling-tubes, through which the cooling agent circulates. From this tank the brine is pumped by the pump E through the pipe $e'$ and forced back into the receptacle B above. It will be seen from this arrangement that the brine being first cooled in chamber B passes thence to the partitioned space $b^2$ of the freezing-cans, thence into the chamber B', thence through the pump back to the receptacle B, thus keeping up a circulation of the brine, which by means of the regulating-cocks already described may at any time be brought to a standstill, or allowed to flow continuously or intermittingly and in such quantities as may be desired by the operator. The fresh water contained in the tank C is also cooled in that tank, and escapes from thence through the pipe $c^2$, which may or may not be provided with a filtering device, as $c^3$. This pipe $c^2$ is also provided with the tubes $c^5$, which are so located on this pipe as to present their outlets over or above the fresh-water cans 1 1, which are left open at the top to receive their supply of fresh water. These pipes are provided with the regulating-cocks $c^6$, by means of which the quantity of fresh water supplied to the freezing-cans may at all times be regulated. At the bottom of the cans are connected the outlet fresh-water tubes $c^7$, which are also provided with regulating-cocks $c^8$, whereby the fresh water to be frozen in the cans may be as the operator may desire, and these pipes $c^7$ have their outlet over the funnel-shaped mouth-pipe $c^9$ of the tube $c^{10}$, and from this the water flows to the fresh-water receptacle C' on the lower floor, which receptacle is also provided with the tubes containing the cooling agent, and from this it is pumped through the pipe $e^2$ back into the original fresh-water receptacle C. As much of the fresh water is used up in the manufacture of ice in the cans D, a fresh supply of water may be obtained through the pipe F, regulated by the cock F', which pipe may be connected with any fresh-water supply. It will thus be seen that while the brine may be kept standing or circulating the fresh water may also be regulated to suit the convenience of the operator, that both of them may be regulated at will and at all times be under the command and subject to the control of the operator. It will also be seen from this construction that the heat is extracted from one side of the can and the water in the can gradually freezes toward its other side. Now, it is well known that the tendency in freezing is to cast the impurities and air contained in the water away from the freezing-point, that where ice is frozen in cans from opposite sides there is concentrated in the center what is called a "core," and that this core contains the impurities of the water and the air-bubbles, which tend to make the ice of less value than that which is clear and free from this core. With this device, therefore, the freezing may be done from one side, and as the impurities are cast to the other side they may be extracted at will, either during the process of freezing or at the end of the freezing operation. I prefer to remove the surcharged water with its excess of impurities and supply purer water in its place, which has been previously cooled, and as this is done during the freezing action no interruption of the process of congelation results. It is also known that where ice is frozen from two or more sides a very low temperature cannot be used, as the process of casting the impurities away from the freezing-point, being generally a slow one, a more rapid freezing would distribute these impurities throughout the entire block, and thus the ice would become opaque, cloudy, or not clear. With my device, although freezing from one side, I am enabled to use a much lower temperature, and thereby gain in time what might otherwise be lost by freezing from one side only. The capacity of this apparatus to drain the impurities within the water during the freezing of the ice enables me to accomplish this object. It will also be seen that the entire operation may be accomplished without submerging the cans in a brine-receptacle, as is generally practiced at present.

In Fig. 7 I have illustrated the double can and have provided in the partitioned brine-space a device which enables me at all times to provide against an overflow of the brine into the fresh-water cans, and in this device I have shown a pipe $d^3$, provided near the bottom of the chamber with an aperture $d^4$, through which the brine will pass out in quantities regulated by the size of the aperture. Should the aperture be not large enough to carry it off and prevent it from overflowing into the fresh-water can, the water will rise to the top of the pipe $d^3$, overflow into the pipe, and discharge itself in that way.

In Fig. 8 is a transverse section of Fig. 7 through the brine-chamber.

This apparatus may be constructed with all of its parts and connections fixed, as illustrated in Fig. 4. I have shown in Figs. 1 and 2 of the drawings a portable device consisting of a car or truck, of which H is a body of the truck mounted upon the wheels $h'$. A skeleton-frame K is properly mounted upon the truck and having braces which pass under and take in the sides and part of the bottom of the can. The brackets $h^2$ are properly secured to the truck, and at its upper end provided with a bearing $p$, in which the journal or journals of the can are supported and allowed to tilt. An iron band, as $p'$, properly secured to the can gives a support for the journal. Upon an extension of one of these journals a wheel $w$ is secured, (see Fig. 1,) which gears into the pinion $n$, whereby the cans are tilted to remove the blocks of ice, as shown in Fig. 9. The whole is placed upon a suitable track. The truck with its cans is run upon the track under the tubes $c^5$, so that the outlets of those tubes will be respectively just over the fresh-water receptacle in the can, and the delivery-hose $b^6$ connected with the partitioned brine-space between them, respectively. A suitable stopping device $h^8$ may be placed as a buffer to the truck and at the same time regulate the exact distance of its connections. A spring-catch, as $h^4$, which operates upon a lug, as $h^5$, prevents the can from falling out of the frame when tilted.

I have also shown in Figs. 3 and 6 an arrangement of truck whereby each can has its own journal supported by opposite brackets, which enables me to tilt any one of the cans without tilting them all.

I do not herein claim, broadly, the method of changing the water to be frozen during the process of freezing, as hereinbefore described, that being the subject of another application.

What I claim, and desire to secure by Letters Patent, is—

1. An outstanding movable ice freezing can, having a brine circulating compartment and provided with inlet and outlet pipes for the brine, and a water compartment, by the side of the brine compartment, the water compartment being exposed to the action of the brine on one side, and unexposed thereto on the opposite side, substantially as described.

2. In an ice making apparatus, an outstanding can having a brine and a water compartment, the circulating brine compartment having inlet and outlet pipes, and arranged to freeze the water from one side to the other, and means for drawing off the water from the said other side and for supplying fresh water thereto, during the process of freezing, substantially as described.

3. In an ice making apparatus, an open outstanding can having a compartment for the water to be frozen and a compartment for the brine, in combination with circulating brine pipes and a device for drawing off the brine and preventing overflow, substantially as described.

4. In an ice making apparatus, means for supplying a cooling agent to one side of the can, means for supplying the liquid to be frozen to the can, and means for regulating the quantities of both during the progress of freezing, in combination with a portable device for holding the can whereby the same can be removed when the liquid is frozen and replaced as required.

5. A movable ice freezing can divided into compartments in one of which the refrigerating liquid is circulated while the other contains the water to be frozen, the water chamber being exposed to the action of the refrigerating fluid upon one side only.

Signed at Baltimore, in the State of Maryland, this 10th day of February, A. D. 1894.

ORMOND HAMMOND, JR.

Witnesses:
JOHN L. HEBB,
PARKS FISHER.